(12) United States Patent
Lee et al.

(10) Patent No.: US 9,487,651 B2
(45) Date of Patent: Nov. 8, 2016

(54) HEMISPHERICAL POLYMETHYLMETHACRYLATE BEADS

(75) Inventors: Sung Ho Lee, Seoul (KR); Jang ho Park, Ansan-si (KR); Sang Uk Kim, Siheung-si (KR); Yang Bae Yoon, Siheung-si (KR); Hyun Nam, Siheung-si (KR)

(73) Assignee: SUNJIN CHEMICAL CO., LTD, Ansan-Si (KR)

( * ) Notice: Subject to any disclaimer, the term of this patent is extended or adjusted under 35 U.S.C. 154(b) by 211 days.

(21) Appl. No.: 14/391,008

(22) PCT Filed: Jul. 10, 2012

(86) PCT No.: PCT/KR2012/005441
§ 371 (c)(1),
(2), (4) Date: Oct. 7, 2014

(87) PCT Pub. No.: WO2013/024972
PCT Pub. Date: Feb. 21, 2013

(65) Prior Publication Data
US 2015/0118493 A1    Apr. 30, 2015

(30) Foreign Application Priority Data

Aug. 17, 2011 (KR) .......................... 10-2011-0081502

(51) Int. Cl.
*C09J 133/12* (2006.01)
*C08L 33/12* (2006.01)
*C08F 220/14* (2006.01)
*C08L 29/04* (2006.01)

(52) U.S. Cl.
CPC .............. *C08L 33/12* (2013.01); *C08F 220/14* (2013.01); *C08L 29/04* (2013.01); *C09J 133/12* (2013.01); *Y10T 428/2982* (2015.01)

(58) Field of Classification Search
CPC ................ C09J 133/12; C08F 220/14; C08F 2222/1026; C08L 29/04; C08L 33/12; Y10T 428/2982
USPC ........................................... 428/402; 524/503
See application file for complete search history.

(56) References Cited

FOREIGN PATENT DOCUMENTS

| JP | 2004-027008 | * | 1/2004 |
|---|---|---|---|
| JP | 2004027008 | | 1/2004 |
| KR | 10-2006-0131090 | * | 12/2006 |
| KR | 20060131090 | | 12/2006 |
| WO | 2011015907 | | 2/2011 |
| WO | WO2011-015907 | * | 2/2011 |

* cited by examiner

*Primary Examiner* — Leszek Kiliman
(74) *Attorney, Agent, or Firm* — Lex IP Meister, PLLC

(57) ABSTRACT

The present invention relates to a hemispherical polymethylmethacrylate bead, wherein the hemispherical polymethylmethacrylate bead of the invention has high adhesive property and oil absorption when applied to cosmetics, medical supply, household items, display devices, lighting fixtures, and miscellaneous goods and especially, it enables cheerful color when applied to cosmetics in comparison with spherical polymethylmethacrylate beads.

8 Claims, 2 Drawing Sheets

HEMISPHERICAL POLYMETHYLMETHACRYLATE BEADS

FIELD OF THE INVENTION

The present invention relates to a hemispherical polymethylmethacrylate bead, more particularly to a hemispherical polymethylmethacrylate bead having high adhesive property and oil absorption when applied to cosmetics, medical supply, household items, display devices, lighting fixtures, and miscellaneous goods and especially enabling cheerful color when applied to cosmetics in comparison with spherical polymethylmethacrylate beads, and a method for the preparation thereof.

BACKGROUND OF THE INVENTION

Since copolymer compounds prepared by synthesizing several monomers are easy to control their shape and physical properties and have excellent processability, they have been widely used in a variety of fields closely connected with human life such as cosmetics, medical supply, household items, display devices, lighting fixtures and miscellaneous goods.

Several organic polymers have been recently developed to satisfy their intended functions at each field, and the development of organic polymers having not only one property but also possessing other several properties at the same time have been vigorously conducted.

Especially, as an organic polymer bead which is one of the organic polymers can control physical properties in various ways, it has been actively utilized in cosmetics, household items such as shampoo, and medical supply such as medicine, the application thereof to display devices such as a light diffusion film has been studied, and multi-pronged effort has been made to improve its properties, as seen in Korean Patent Application No. 10-2004-85658.

Lately, in order to enhance the hue and skin feeling of cosmetics, studies of applying beads prepared by grinding spherical PMMA (polymethylmethacrylate) beads to cosmetic pigment have been made, but there was a major drawback with their manufacturing costs and shape control.

SUMMARY OF THE INVENTION

In order to solve the problems of the prior arts as mentioned above, it is an object of the invention to provide a hemispherical polymethylmethacrylate bead having high adhesive property and oil absorption when applied to cosmetics, medical supply, household items, display devices, lighting fixtures, and miscellaneous goods, especially enabling cheerful color when applied to cosmetics in comparison with spherical polymethylmethacrylate beads.

Further, it is another object of the invention to provide a method for preparing a hemispherical polymethylmethacrylate bead having high adhesive property and oil absorption when applied to cosmetics, medical supply, household items, display devices, lighting fixtures, and miscellaneous goods, especially enabling cheerful color when applied to cosmetics in comparison with spherical polymethylmethacrylate beads, wherein the method can easily control a bead size and enables the mass production thereof with high productivity.

The invention provides a polymethylmethacrylate bead, wherein the shape of the polymethylmethacrylate bead is hemispherical.

Preferably, the hemispherical polymethylmethacrylate bead may have a TAP density of 0.1 to 0.5 g/ml.

Also, preferably, the hemispherical polymethylmethacrylate bead may have oil absorption of 2.4 to 3.0 cc/g.

Further, the invention provides a method for preparing a hemispherical polymethylmethacrylate bead comprising adding an acrylic monomer, a crosslinking agent, an initiator, and a cosolvent to a solvent to polymerize them, and then washing and drying them, wherein the difference between the boiling point (BP) of the cosolvent and the reaction temperature of the initiator is −5 to 15° C.

Further, the invention provides cosmetics, medical supply, household items, display devices, lighting fixtures, and miscellaneous goods comprising the hemispherical polymethylmethacrylate bead.

The hemispherical polymethylmethacrylate bead in accordance with the invention has high adhesive property and oil absorption when applied to cosmetics, medical supply, household items, display devices, lighting fixtures, and miscellaneous goods and especially, it enables cheerful color when applied to cosmetics in comparison with spherical polymethylmethacrylate beads.

DETAILED DESCRIPTION OF THE INVENTION

The invention will be described in detail.

The hemispherical polymethylmethacrylate bead of the invention is characterized in that its shape is hemispherical.

Figure 1:
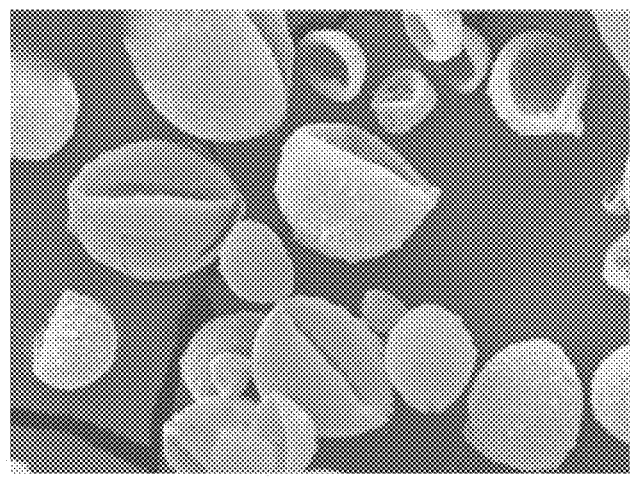
FIG. 1 is a photograph of hemispherical polymethylmethacrylate beads prepared according to one example of the invention.

Specifically, the hemispherical polymethylmethacrylate bead of the invention is hemispherical as shown in FIG. 1 and the inside thereof is in empty shape.

Preferably, the hemi polymethylmethacrylate bead of the invention may have a size of 1 um to 30 um, a TAP density of 0.1 to 0.5 g/ml, and oil absorption of 2.4 to 3.0 cc/g. In comparison with the previous ordinary spherical polymethylmethacrylate beads which have a TAP density of 0.5 to 1.2 ml/g and oil absorption of 0.2 to 1.0 cc/g, the hemispherical polymethylmethacrylate bead of the invention has remarkably increased oil absorption and a decreased specific weight.

Also, the hemispherical polymethylmethacrylate bead of the invention can remarkably increase the adhesiveness of cosmetic pigment to skin when applied to cosmetic pigment due to its morphological characteristics, and it can increase the sense of hue of cosmetic pigment by providing the cosmetic pigment with cheerful color.

Further, the invention provides a method for preparing the hemispherical polymethylmethacrylate bead comprising adding i) an acrylic monomer, ii) a crosslinking agent, iii) an initiator, and iv) a cosolvent to v) a solvent to polymerize them, and then washing and drying them, wherein the difference between the boiling point (BP) of the cosolvent and the reaction temperature of the initiator is −5 to 15° C. Preferably, the difference between the boiling point (BP) of the cosolvent and the reaction temperature of the initiator is 0 to 10° C.

In the preparation method of the hemispherical polymethylmethacrylate bead of the invention, i) the acrylic monomer and ii) the crosslinking agent are reacted to synthesize polymethylmethacrylate, wherein the acrylic monomer may be typically methyl(meth)acrylate, and the crosslinking agent may be at least one material selected from the group consisting of trimethylol methane tetracrylate, trimethylol methane triacrylate, trimethylol butane triacrylate, ethyleneglycol diglycidyl methacrylate and divinyl benzene. Preferably, the content ratio of i) the acrylic monomer and ii) multi-functional monomer may be 10 to 90 parts by weight:90 to 10 parts by weight, more preferably 30 to 70 parts by weight:70 to 30 parts by weight. When the hemispherical beads are prepared within the above range, it is easy to control their physical properties and their particle size suitable for cosmetics.

Also, iii) the initiator in the invention may be any initiators used in the preparation of polymethylmethacrylate and preferably, azo group initiators capable of initiating by thermal degradation in synthesis non-aqueous phase (2,2-azobisisobutyronitrile, 4,4-azobis(4)-cyanopentanoic acid), 2,2-azobis(2-methylbutyronitrile), 2,2-azobis(2,4-dimethylvalenonitrile) and peroxides (benzoyl peroxide, lauryl peroxide, octanoyl peroxide, 3,3,5-trimethyl hexanoyl peroxide may be used alone or in a mixture of two or more. More preferably, the amount of the initiator may be 1 to 5 parts by weight with regard to 100 parts by weight of the total sum of the acrylic monomer and the crosslinking agent. Preferably, the reaction temperature of the initiator may be 70 to 85° C., more preferably, 70 to 80° C. When the hemispherical beads are prepared within the above range, it is easy to control their physical properties and their shape.

Also, iv) the cosolvent in the preparation of the hemispherical polymethylmethacrylate of the invention serves to form polymethylmethacrylate beads to be polymerized during the polymerization into hemispherical shape. The difference between the boiling point (BP) of the cosolvent and the reaction temperature of the initiator is −5 to 15° C., preferably 0 to 10° C., and it is noted to choose a cosolvent having a suitable boiling point according to the reaction temperature of an initiator to be used. For example, when the reaction temperature of an initiator is 75 to 80° C., a cosolvent having a boiling point of 70 to 95° C. can be used, and for instance, there can be used cyclohexane (BP 80.8° C.), ethyl acetate (BP 75-85° C.), methyl ethyl ketone (BP 77-82° C.), ortho chloro toluene (BP 86.7° C.), and isopropyl alcohol (BP 79-82° C.).

Figure 2:
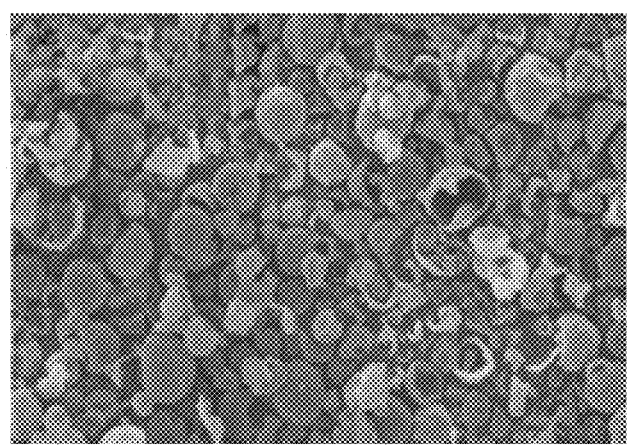
FIG. 2 is a photograph is amorphous polymethylmethacrylate beads prepared according to comparative example 1 of the invention.
Figure 3:
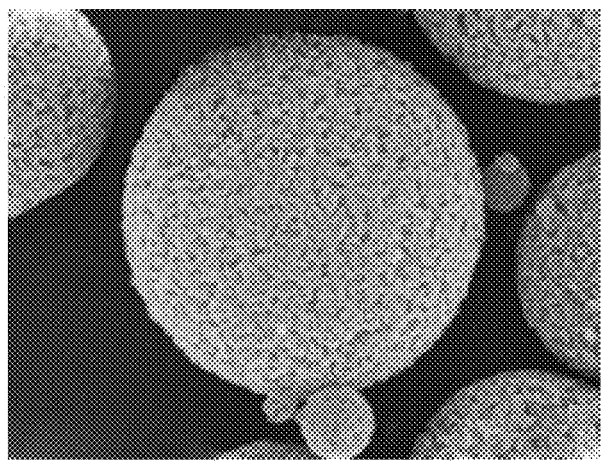
FIG. 3 is a photograph is multiporous polymethylmethacrylate beads prepared according to comparative example 2 of the invention.

If the boiling point of a cosolvent to be used in the invention is high, with exceeding the above temperature range in comparison with the reaction temperature of an initiator, amorphous beads are prepared as shown in FIG. 2, and if it is extremely high, multiporous beads are prepared as shown in FIG. 3 so that the production of hemispherical polymethylmethacrylate beads is not possible.

The amount of the cosolvent in the invention may be preferably 100 to 300 parts by weight, more preferably 100 to 200 parts by weight with regard to 100 parts by weight of the total sum of the acrylic monomer and the crosslinking agent. When polymethylmethacrylate are prepared within the above range, it has excellent physical properties such as intensity and it is advantageous to control its shape and particle size.

Further, in the preparation method of the hemispherical polymethylmethacrylate of the invention, a stabilizer may be further included, if needed. The stabilizer may be at least one material selected from the group consisting of polyvinyl pyrrolidone, polyvinyl methyl ether, polyethyleneimine, poly acrylic acid, polyvinyl alcohol, vinyl acetate copolymer, ethyl cellulose and hydroxypropyl cellulose. Preferably, the amount of the stabilizer may be 1 to 10 parts by weight with regard to 100 parts by weight of the total sum of the acrylic monomer and the crosslinking agent.

The solvent in the invention is a solvent capable of mixing with the ingredients to be used for polymerization, and any ordinary solvents used to prepare polymethylmethacrylate beads may be used and for example, alcohols (methyl alcohol, ethyl alcohol, butyl alcohol, amyl alcohol, octyl alcohol or benzyl alcohol, etc.), polyhydric alcohol (ethylene glycol, propylene glycol, glycerin) or water may be used. Preferably, the amount of the solvent may be 500 to 2500 parts by weight with regard to the 100 parts by weight of the total sum of the acrylic monomer and the crosslinking agent.

The method for preparing the hemispherical polymethylmethacrylate bead of the invention comprises adding the acrylic monomer, crosslinking agent, initiator and cosolvent to the solvent which is, if necessary, dissolved with a suspension stabilizer to polymerized them and preferably, it comprises dissolving the stabilizer in the solvent and then cooling it below the room temperature, adding the acrylic monomer, crosslinking agent, initiator and cosolvent thereto and emulsifying them using a homo-mixer to obtain liquid drops with a desired size, and then inserting the obtained emulsion into a 4-neck reactor to let them react under nitrogen atmosphere within 6 to 40 hours or so in consideration of residual monomer amounts. If a stirring speed is too fast during the reaction, agglomeration may happen so it would be advisable to maintain a proper stirring speed.

Further, the method for preparing the hemispherical polymethylmethacrylate bead of the invention comprises washing and drying the hemispherical polymethylmethacrylate bead synthesized through the polymerization reaction, and the washing is conducted to eliminate unreacted monomers, stabilizers and cosolvents and can be performed with water, methyl ethyl ketone (MEK) solution, isopropylalcohol (IPA) solution, acetone solution, ethyl acetate solution, methanol solution, or methylenechloride solution. Especially, in order to be used as a cosmetic component, the residual amount of the unreacted monomers and cosolvents should be minimal (10 ppm, 10 ppm respectively) so it would be advisable to wash them two or three times using the washing solvent.

The drying step is a step to dry the hemispherical polymethylmethacrylate bead that goes through the washing and preferably, it would be advisable to carry out the drying step under a vacuum condition at a temperature lower than the glass transition temperature of polymethylmethacrylate in consideration of the elimination of the cosolvent and the glass transition temperature.

The hemispherical polymethylmethacrylate bead of the invention prepared through the above polymerization, washing and drying step may further undergo a sorting process to control particle size distribution. The sorting may be carried out according to ordinary methods and specifically, the sorting may be done by sifting or regulating the feeding speed, cycle number, and air volume of an ordinary classifier to control the particle size distribution of the beads.

The method for preparing the hemispherical polymethylmethacrylate bead according to the present invention can easily control a bead size and it is suitable for mass production so that it can manufacture hemispherical polymethylmethacrylate beads with high productivity.

The hemispherical polymethylmethacrylate bead of the invention described in the above has high adhesive property and oil absorption when applied to cosmetics, medical supply, household items, display devices, lighting fixtures, and miscellaneous goods and especially, it enables cheerful color when applied to cosmetics in comparison with spherical polymethylmethacrylate beads.

For better understanding of the present invention, preferred examples follow. The following examples are intended to merely illustrate the invention without limiting the scope of the invention.

EXAMPLES

Example 1

600 parts by weight of water dissolved with 2 parts by weight of azobisisobutyronitrile as an initiator and 2 parts by weight of polyvinylalcohol (PVA) as a stabilizer, and 200 parts by weight of cyclohexane as a cosolvent were added together to 100 parts by weight of a monomer mixture comprised of 80 parts by weight of methyl(meth)acrylate (MMA) and 20 parts by weight of trimethylolmethanetriacrylate and then they were emulsified using a homogenizer. Thereafter, the produced emulsion was inserted into a reaction vessel to react at 50° C. for 4 hours and then heated to 70° C. and further reacted for 20 hours to prepare hemispherical beads.

The above prepared hemispherical beads were filtered, washed with a mixture washing solution of water, ethanol solution, and methanol solution, and then the filtrates were dried in a vacuum oven for 24 hours to prepare hemispherical polymethylmethacrylate beads. The prepared hemispherical polymethylmethacrylate beads have hemispherical shape as shown in FIG. 1.

Example 2

With the exception that 2,2-azobis(2,4-dimethylvalenonitrile) was used as an initiator, the same procedures as Example 1 were carried out to prepare hemispherical polymethylmethacrylate beads. The prepared hemispherical polymethylmethacrylate beads have the same hemispherical shape as those of Example 1.

Comparative Example 1

The same procedures as Example 1 were carried out to prepare polymethylmethacrylate beads, with the proviso that a cosolvent which has a boiling point 25° C. higher than the reaction temperature of the initiator was employed. The prepared polymethylmethacrylate beads have amorphous shape as shown in FIG. 2, and no hemispherical polymethylmethacrylate beads were prepared.

Comparative Example 2

The same procedures as Example 1 were carried out to prepare polymethylmethacrylate beads, with the proviso that a cosolvent which has a boiling point 35° C. higher than the reaction temperature of the initiator was employed. The prepared polymethylmethacrylate beads have spherical multiporous shape as shown in FIG. 3, and no hemispherical polymethylmethacrylate beads were prepared.

Comparative Example 3

Figure 4:
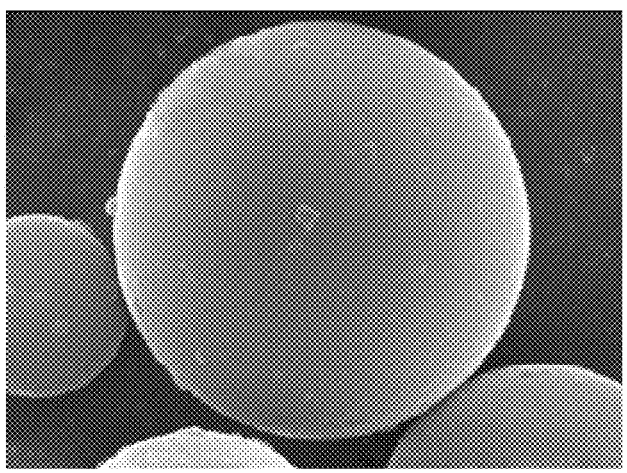
FIG. 4 is a photograph is typical spherical polymethylmethacrylate beads prepared according to comparative example 3 of the invention.

The same procedures as Example 1 were carried out to prepare polymethylmethacrylate beads, with the proviso that no cosolvents were used to prepare polymethylmethacrylate beads. The prepared polymethylmethacrylate beads have typical spherical shape as shown in FIG. 4, and no hemispherical polymethylmethacrylate beads were prepared.

The hemispherical polymethylmethacrylate bead according to the present invention has high adhesive property and oil absorption when applied to cosmetics, medical supply, household items, display devices, lighting fixtures, and miscellaneous goods and especially, it enables cheerful color when applied to cosmetics in comparison with spherical polymethylmethacrylate beads.

What is claimed is:

1. A polymethylmethacrylate bead wherein the shape of the polymethylmethacrylate bead is hemispherical and the polymethylmethacrylate bead has oil absorption of 2.4 to 3.0 cc/g.

2. The polymethylmethacrylate bead as claimed in claim 1, wherein the hemispherical polymethylmethacrylate bead has a TAP density of 0.1 to 0.5 g/ml.

3. A method for preparing a hemispherical polymethylmethacrylate bead comprising adding an acrylic monomer, a crosslinking agent, an initiator, and a cosolvent to a solvent to polymerize them, and then washing and drying them, wherein the difference between the boiling point (BP) of the cosolvent and the reaction temperature of the initiator is −5 to 15° C.,
   wherein the cosolvent is at least one selected from the group consisting of cyclohexane, ethyl acetate, methyl ethyl ketone, ortho chloro toluene, and isopropyl alcohol, and it is included in an amount of 100 to 400 parts by weight with regard to the total 100 parts by weight of the monomers to be used for the preparation of the bead.

4. The method for preparing the hemispherical polymethylmethacrylate bead as claimed in claim 3, wherein the difference between the boiling point (BP) of the cosolvent and the reaction temperature of the initiator is 0 to 10° C.

5. The method for preparing the hemispherical polymethylmethacrylate bead as claimed in claim 3, wherein at least one stabilizer selected from the group consisting of polyvinyl pyrrolidone, polyvinyl methyl ether, polyethyleneimine, poly acrylic acid, polyvinyl alcohol, vinyl acetate copolymer, ethyl cellulose and hydroxypropyl cellulose was used in an amount of 0.1 to 5 parts by weight with regard to the total 100 parts by weight of the monomers to be used for the preparation of the bead.

6. The method for preparing the hemispherical polymethylmethacrylate bead as claimed in claim 3, wherein the initiator is at least one selected from the group consisting of 2,2-azobisisobutyronitrile, 4,4-azobis(4)-cyanopentanoic acid, 2,2-azobis(2-methylbutyronitrile), 2,2-azobis(2,4-dimethylvalenonitrile), benzoyl peroxide, lauryl peroxide, octanoyl peroxide, and 3,3,5-trimethyl hexanoyl peroxide, and it is included in an amount of 0.1 to 5 parts by weight with regard to the total 100 parts by weight of the monomers to be used for the preparation of the bead.

7. The method for preparing the hemispherical polymethylmethacrylate bead as claimed in claim 3, further comprising a sorting process after the drying step.

8. A cosmetic, medical supply, household item, display device or lighting fixture comprising the hemispherical polymethylmethacrylate described in claim 1.

* * * * *